United States Patent
Shatdal et al.

(10) Patent No.: US 8,832,157 B1
(45) Date of Patent: Sep. 9, 2014

(54) SYSTEM, METHOD, AND COMPUTER-READABLE MEDIUM THAT FACILITATES EFFICIENT PROCESSING OF DISTINCT COUNTS ON SEVERAL COLUMNS IN A PARALLEL PROCESSING SYSTEM

(75) Inventors: Ambuj Shatdal, Ukiah, CA (US); Yu Xu, San Diego, CA (US); Todd Walter, Mississauga (CA)

(73) Assignee: Teradata US, Inc., Dayton, OH (US)

( * ) Notice: Subject to any disclaimer, the term of this patent is extended or adjusted under 35 U.S.C. 154(b) by 230 days.

(21) Appl. No.: 12/983,137

(22) Filed: Dec. 31, 2010

Related U.S. Application Data

(60) Provisional application No. 61/291,697, filed on Dec. 31, 2009.

(51) Int. Cl.
*G06F 17/30* (2006.01)

(52) U.S. Cl.
CPC ............... *G06F 17/30286* (2013.01)
USPC ........................................................ 707/802

(58) Field of Classification Search
CPC .................................................. G06F 17/30286
USPC ........................................................... 707/802
See application file for complete search history.

(56) References Cited

U.S. PATENT DOCUMENTS

2005/0138001 A1* 6/2005 Mittal et al. ................. 707/2
2005/0278355 A1* 12/2005 Gonzalez ................. 707/100
2007/0239663 A1* 10/2007 Dyskant ................... 707/2

* cited by examiner

*Primary Examiner* — Jensen Hu
(74) *Attorney, Agent, or Firm* — Steve McDonald; Randy L. Campbell, Jr.

(57) ABSTRACT

A system, method, and computer-readable medium that facilitate counting the number of distinct values in several columns of a table utilizing parallel aggregation mechanisms.

17 Claims, 11 Drawing Sheets

| | g | c1 | c2 | cn | x |
|---|---|----|----|----|---|
| 510a | 2 | 10 | 52 | 18 | 117 |
| 510b | 5 | 15 | 55 | 20 | 150 |
| 510c | 8 | 13 | 49 | 15 | 152 |
| 510d | 4 | 20 | 60 | 15 | 111 |
| 510e | 2 | 14 | 90 | 20 | 42 |
| 510f | 15 | 8 | 70 | 19 | 180 |
| 510g | 2 | 7 | 62 | 11 | 79 |
| 510h | 8 | 5 | 54 | 13 | 68 |
| 510i | 5 | 4 | 18 | 15 | 57 |

| | g | c1 |
|---|---|----|
| 540a | 2 | 111-11-1111 |
| 540b | 4 | 222-22-2222 |
| 540c | 5 | 333-33-3333 |
| 540d | 8 | 444-44-4444 |

SYSTEM, METHOD, AND COMPUTER-READABLE MEDIUM THAT FACILITATES EFFICIENT PROCESSING OF DISTINCT COUNTS ON SEVERAL COLUMNS IN A PARALLEL PROCESSING SYSTEM

CROSS REFERENCE TO RELATED APPLICATIONS

This application claims priority under 35 U.S.C. §119(e) to the following and commonly-assigned patent application, which is incorporated herein by reference:

Provisional Patent Application Ser. No. 61/291,697, entitled "SYSTEM, METHOD, AND COMPUTER-READABLE MEDIUM THAT FACILITATE EFFICIENT PROCESSING OF DISTINCT COUNTS ON SEVERAL COLUMNS IN A PARALLEL PROCESSING SYSTEM" by Ambuj Shatdal, Yu Xu, and Todd Walter; filed on Dec. 31, 2009.

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost, e.g., response time, CPU processing, I/O processing, network processing, etc., as determined by an optimizer. The response time is the amount of time it takes to complete the execution of a query on a given system.

Counting the number of distinct values in several columns of a table is a common query. However, current parallel aggregation mechanisms do not handle this situation well and typically introduce unnecessary and hence inefficient processing during performance of such queries.

Therefore, what is needed is a mechanism that overcomes the described problems and limitations.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

In accordance with disclosed embodiments, database system mechanisms provide for very efficient and practical mechanisms for computing distinct counts on several columns in a parallel database system.

Figure 1:
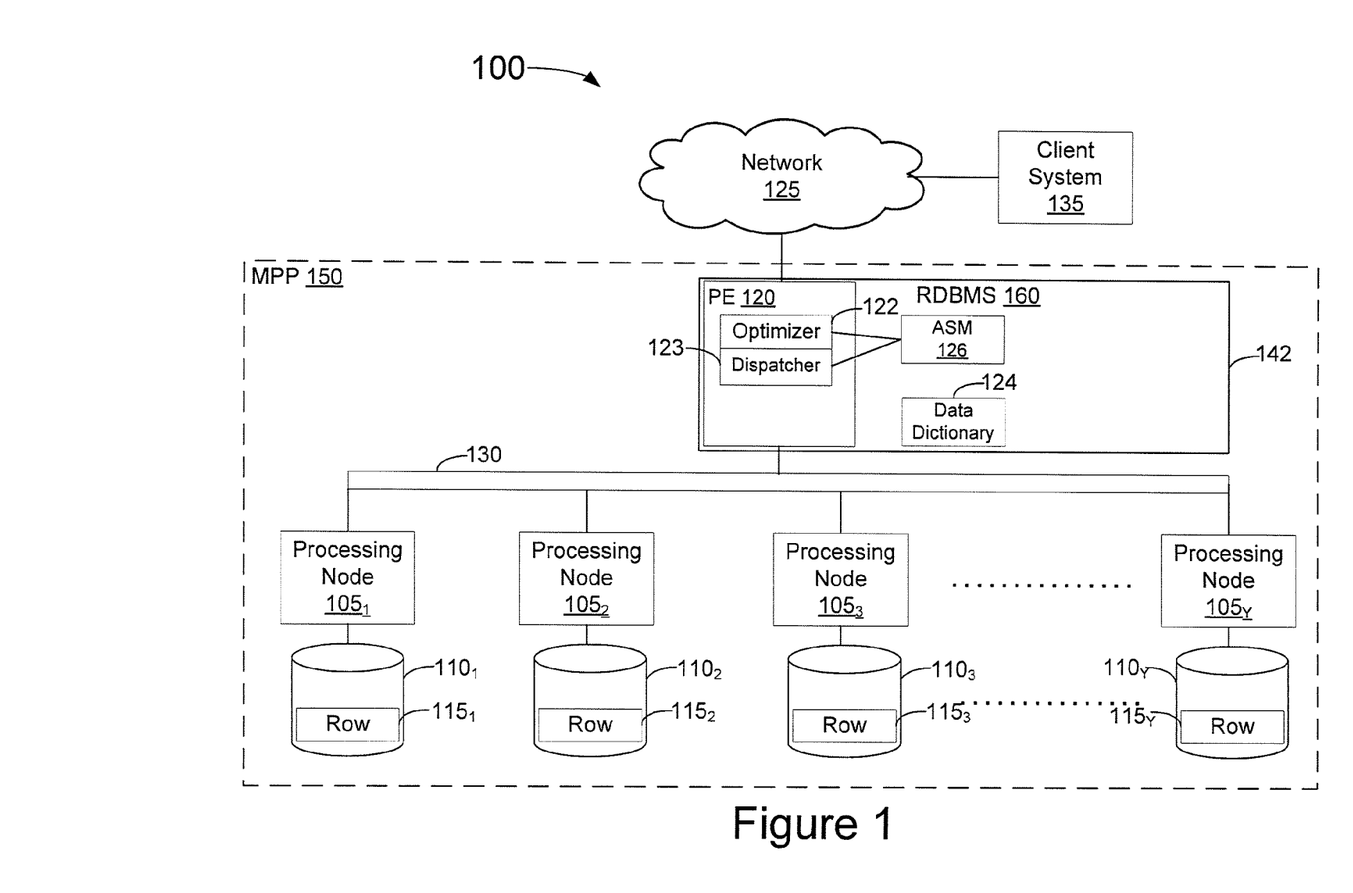
FIG. 1 depicts a diagrammatic representation of an exemplary architecture for a large database system that is suited for implementing efficient processing mechanisms for queries featuring distinct counts of several table columns in accordance with disclosed embodiments.

FIG. 1 depicts a diagrammatic representation of an exemplary architecture for a large database system 100, such as a Teradata Active Data Warehousing System, that is suited for implementing efficient processing mechanisms for queries featuring distinct counts of several table columns in accordance with disclosed embodiments.

The database system 100 includes a relational database management system (RDBMS) 160 built upon a massively parallel processing (MPP) system 150. As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Y}$ among the processing nodes $105_{1 \ldots Y}$ and accesses processing nodes $105_{1 \ldots Y}$ via an interconnect 130. The parsing engine 120 also coordinates the retrieval of data from the data-storage facilities $110_{1...Y}$ in response to queries received from a user, such as one at a client computer system 135 connected to the database system 100 through a network 125 connection. The parsing engine 120, on receiving an incoming database query, interfaces with an optimizer 122 and an active system management (ASM) 126 module. The optimizer 122 component is invoked to assess the best plan for execution of the query. As is understood, a query plan, also referred to as a query execution plan, comprises a set of steps used to access or modify information in a SQL relational database management system. Because SQL is declarative, there are typically a large number of alternative ways—corresponding to different query plans—to execute a given query, and many of the query plans may exhibit widely varying performance. When a query is submitted to the database system, the optimizer may evaluate some of the different query plans for executing the query and may select what the optimizer determines the best query plan, e.g., based on a query plan cost analysis. Selecting the optimal query-execution plan includes, among other things, identifying which of the processing nodes $105_{1...Y}$ are involved in executing the query and which database tables are involved in the query, as well as choosing which data-manipulation techniques will serve best in satisfying the conditions of the query. To this end, the parser and/or optimizer may access a data dictionary 124 that specifies the organization, contents, and conventions of one or more databases. For example, the data dictionary 124 may specify the names and descriptions of various tables maintained by the MPP system 150 as well as fields of each database. Further, the data dictionary 124 may specify the type, length, and/or other various characteristics of the stored tables. The database system typically receives queries in a standard format, such as the Structured Query Language (SQL) put forth by the American National Standards Institute (ANSI).

The ASM 126 may be implemented as a "closed-loop" system management (CLSM) architecture capable of satisfying a set of workload-specific goals. In other words, the system is a goal-oriented workload management system capable of supporting complex workloads and capable of self-adjusting to various types of workloads. The ASM 126 is communicatively interfaced with a dispatcher 123 to receive query execution plan costs therefrom.

Figure 2:
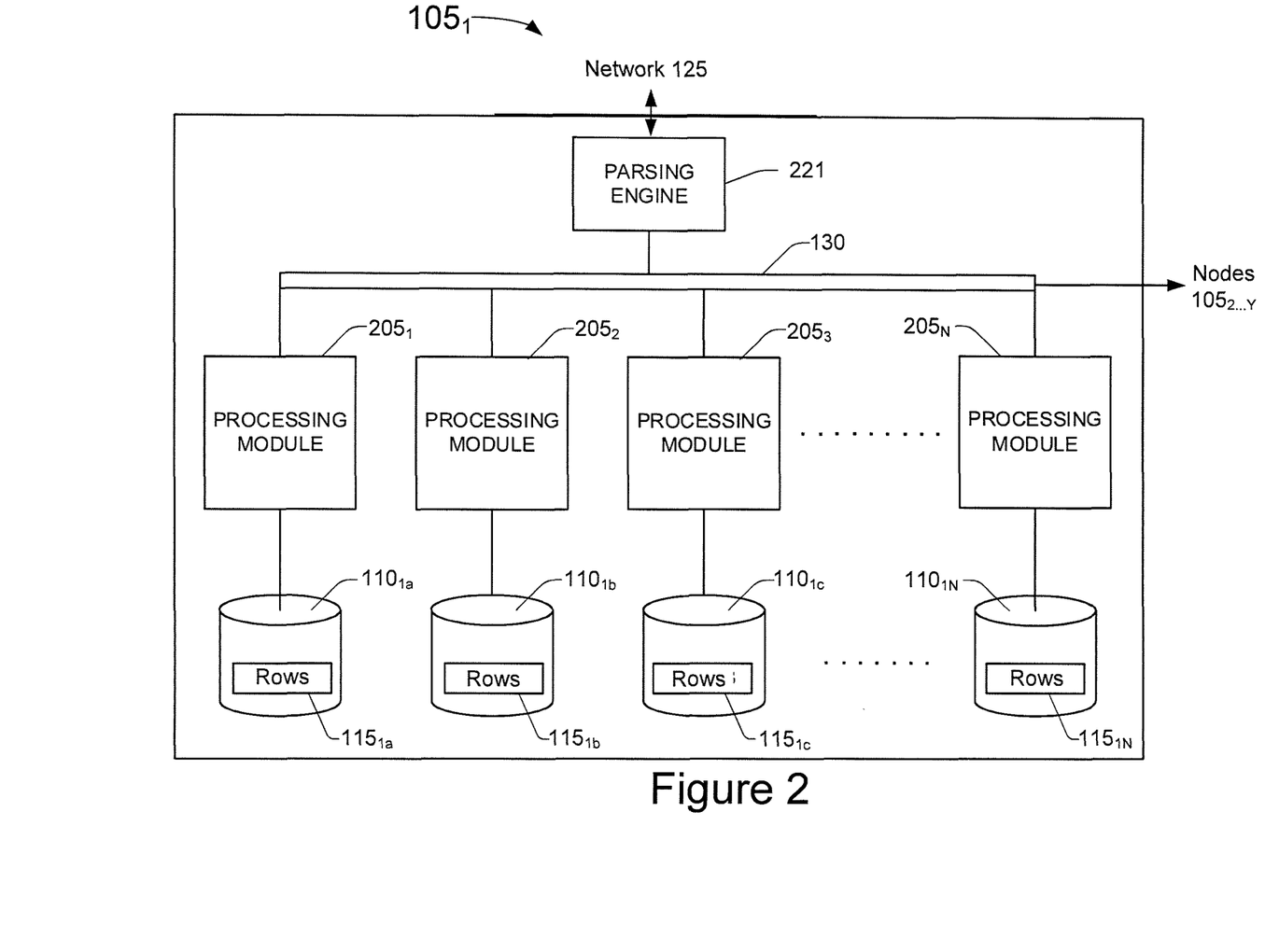
FIG. 2 depicts a diagrammatic representation of a sample architecture for one node of the database system depicted in FIG. 1.

FIG. 2 depicts a diagrammatic representation of a sample architecture for one node $105_1$ of the DBS 100. The DBS node $105_1$ includes one or more processing modules $205_{1...N}$, e.g., AMPs, connected by an interconnect 130 that manage the storage and retrieval of data in data-storage facilities $110_{1a...1N}$. The processing module $205_{1...N}$ and the dispatcher 123 depicted in FIG. 1 are collectively referred to herein as a runtime query execution system. Each of the processing modules $205_{1...N}$ may be one or more physical processors or each may be a virtual processor, with one or more virtual processors running on one or more physical processors. For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1...N}$ manages a portion of a database that is stored in a corresponding one of the data-storage facilities $110_{1a...1N}$. Each of the data-storage facilities $110_{1a...1N}$ includes one or more disk drives. The DBS may include multiple nodes $105_{2...Y}$ in addition to the illustrated node $105_1$, connected by way of the interconnect 130.

The system stores data in one or more tables in the data-storage facilities $110_{1a...1N}$. The rows $115_{1a...1N}$ of the tables are stored across multiple data-storage facilities $110_{1a...1N}$ to ensure that the system workload is distributed evenly across the processing modules $205_{1...N}$. A parsing engine 221 organizes the storage of data and the distribution of table rows $110_{1a...1N}$ among the processing modules $205_{1...N}$. The parsing engine 221 also coordinates the retrieval of data from the data-storage facilities $110_{1a...1N}$ in response to queries received from a user at a client computer system 135. The DBS 100 usually receives queries and commands to build tables in a standard format, such as SQL.

In one implementation, the rows $115_{1a...1N}$ are distributed across the data-storage facilities $110_{1a...1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a...1N}$ and associated processing modules $205_{1...N}$ by a hash bucket map. The characteristics of the columns chosen for the primary index determine how evenly the rows are distributed.

Figure 3:
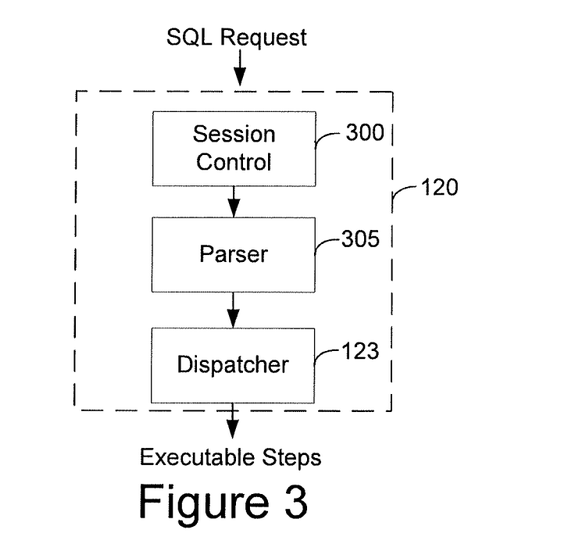
FIG. 3 is a diagrammatic representation of a parsing engine implemented in accordance with an embodiment.
Figure 4:
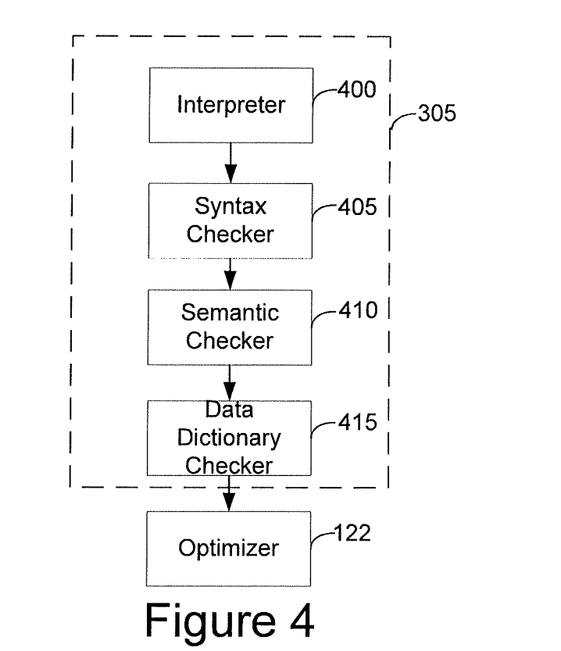
FIG. 4 is a diagrammatic representation of a parser implemented in accordance with an embodiment.

In one example system, a parsing engine, such as the parsing engine 120, is made up of three components: a session control 300, a parser 305, and a dispatcher 123 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). The optimizer 122 is then invoked and selects the least expensive plan to perform the request, and a dispatcher 123 coordinates the runtime execution of executable steps of the optimizer's 122 query execution plan with the processing modules $205_1$-$205_N$.

Figure 5A:
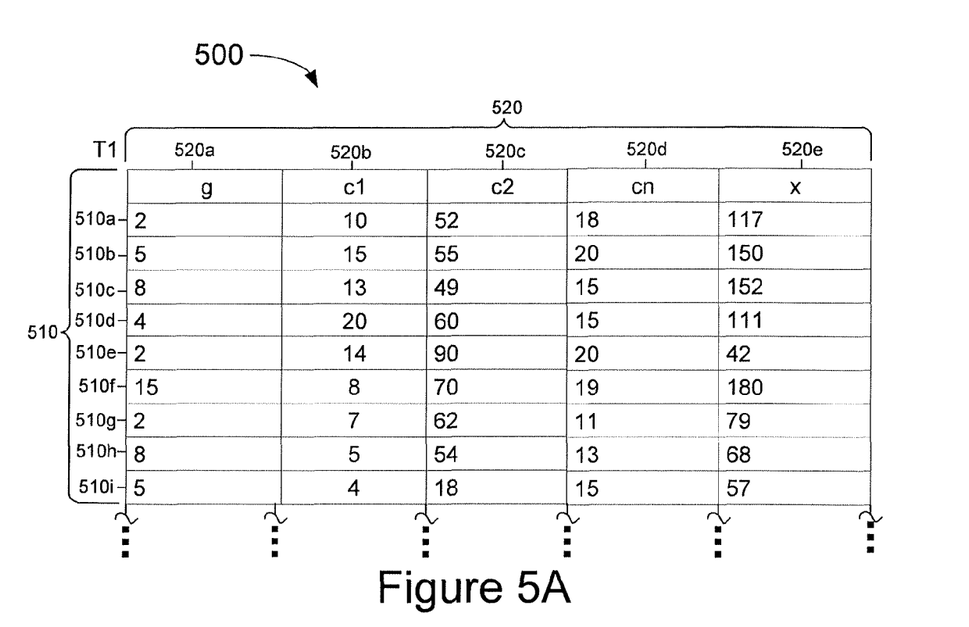
FIG. 5A is a diagrammatic representation of a portion of an exemplary table on which processing of distinct counts on a plurality of columns in a parallel processing system may be implemented in accordance with disclosed embodiments.

FIG. 5A is a diagrammatic representation of a portion of an exemplary table 500 on which processing of queries featuring distinct counts on a plurality of columns in a parallel processing system may be implemented in accordance with disclosed embodiments.

In the illustrative example, table 500 has a label, or name, of T1, and comprises a plurality of records 510a-510i (collectively referred to as records 510) and fields 520a-520e (collectively referred to as fields 520). Each record 510 comprises data elements in respective fields, or attributes, 520. In the present example, the table 500 includes fields 520 having respective labels of "g", "c1", "c2", "cn", and "x".

For illustrative purposes, assume the following SQL aggregation query is applied to the table 500 depicted in FIG. 5A:
SELECT g,
COUNT(DISTINCT c1),
COUNT(DISTINCT c2), COUNT(DISTINCT cn),
SUM(x)
FROM T1
GROUP BY g;

In accordance with disclosed embodiments, efficient processing mechanisms are provided for such a query applied in a parallel processing system. The described mechanisms provide a practical approach for computing an aggregate function including a DISTINCT COUNT command applied on several columns of a table in a parallel database system and that advantageously eliminates unnecessary processing costs.

In the described examples and description, it is assumed that the table on which the SQL query including an aggregation function is applied is distributed across multiple nodes of a parallel processing system. That is, at least two or more processing nodes are allocated a portion of the table on which the query is applied, and thus at least two or more processing nodes are involved in processing of the query.

Figure 6:
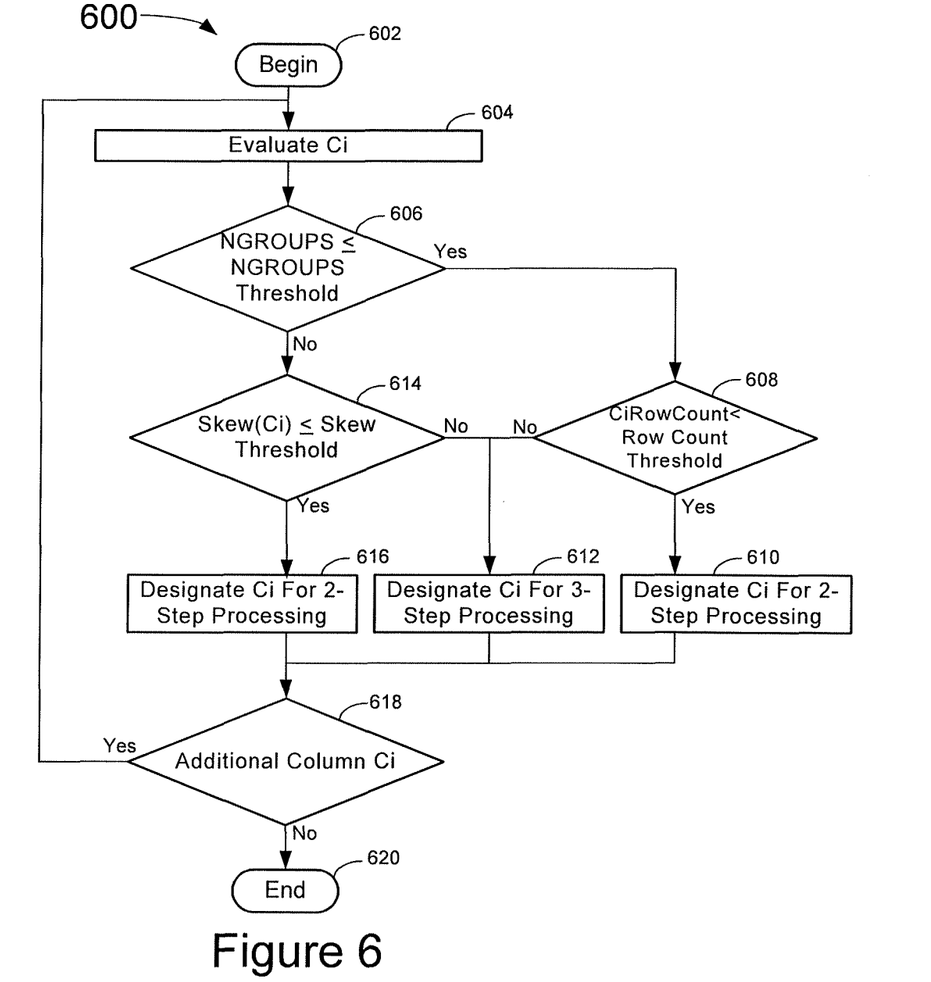
FIG. 6 shows a flowchart that depicts processing of a column evaluation routine that determines whether a column is to be processed using 2- or 3-step processing for each processing module involved in processing of an aggregation query featuring a DISTINCT COUNT command implemented in accordance with an embodiment.

FIG. 6 shows a flowchart 600 that depicts processing of an evaluation routine that determines whether a column is to be processed using 2- or 3-step processing for each AMP involved in processing of an aggregation query featuring a distinct count command on multiple columns implemented in accordance with an embodiment. The processing steps of FIG. 6 may be implemented as computer-executable instructions tangibly embodied on a computer-readable medium executable by a processing system, such as one or more of the processing nodes $105_1$-$105_Y$ depicted in FIG. 1.

The evaluation of whether a particular column, Ci, on which the DISTINCT command is applied may be, for example, performed by the optimizer if sufficient statistics are available. Alternately, the evaluation of a column, Ci, may be performed at run time using sampling based analysis. In an embodiment, the algorithm may take into account an expected number of rows (referred to herein as "NGROUPS") in a GROUP BY clause applied to the attribute, g. Further, the algorithm may take into account the expected number of rows (referred to herein as "CiRowCount") in the GROUP BY clause applied to the attribute, g, and the particular attribute, Ci, being evaluated for 2- or 3-step processing. Further, the algorithm may take into account data skew (referred to herein as Skew(Ci)) of a column, Ci, on which the DISTINCT COUNT command is applied. The skew is a measure of the uniformity of sizes of each group as is understood.

The evaluation routine is invoked (step 602), and a column, Ci, on which the DISTINCT command is applied is evaluated (step 604). An evaluation may then be made to determine if the expected number of rows, NGROUPS, for the GROUP BY modifier applied to the selected attribute, g, for the evaluated column, Ci, is small (step 606). For example, a rows threshold, "NGROUPS Threshold," may be compared to the expected number of rows of the GROUP BY modifier applied to the selected attribute, g. If the expected number of rows is less than or equal to the rows threshold thereby qualifying the expected number of rows as small, the evaluation routine may then evaluate whether the expected number of rows resulting from applying the GROUP BY modifier to the selected attribute, g, and the attribute, Ci, on which the DISTINCT command is applied is small (step 608). For example, the expected number of rows, CiRowCount, may be compared with a threshold ("Row Count Threshold"). If the expected number of rows, CiRowCount, is less than the row count threshold thereby indicating that the expected number of rows is small, the currently evaluated column, Ci, may be designated for 2-step processing (step 610), and an evaluation may then be made to determine if another column remains for evaluation (step 618).

Returning again to step 608, if the expected number of rows, CiRowCount, is not less than the row count threshold thereby indicating that the expected number of rows is large, the currently evaluated column, Ci, may be designated for 3-step processing (step 612). Thereafter, an evaluation may then be made to determine if another column remains for evaluation according to step 618.

Returning again to step 606, if the expected number of rows, NGROUPS, for the GROUP BY modifier applied to the selected attribute, g, for the evaluated column, Ci, is not identified as small, that is the NGROUPS value exceeds the NGROUPS threshold, an evaluation may then be made to determine if the data skew, Skew(Ci), is small, e.g., less than or equal to a skew threshold (step 614). If not, thereby indicating the skew for the evaluated column is large, the evaluated column, Ci, may be designated for 3-step processing according to step 612. Thereafter, an evaluation may then be made to determine if another column remains for evaluation according to step 618.

Returning again to step 614, if the skew for the evaluated column is small, e.g., less than or equal to the skew threshold, the evaluated column may then be designated for 2-step processing (step 616). An evaluation may then be made to determine if another column remains for evaluation according to step 618.

If an additional column, Ci, on which the DISTINCT COUNT command is applied remains for evaluation, the routine may return to step 604 to evaluate the next column, Ci. When no additional columns remain to be evaluated for 2- or 3-step processing, the evaluation cycle may then end (step 620).

Figure 7A:
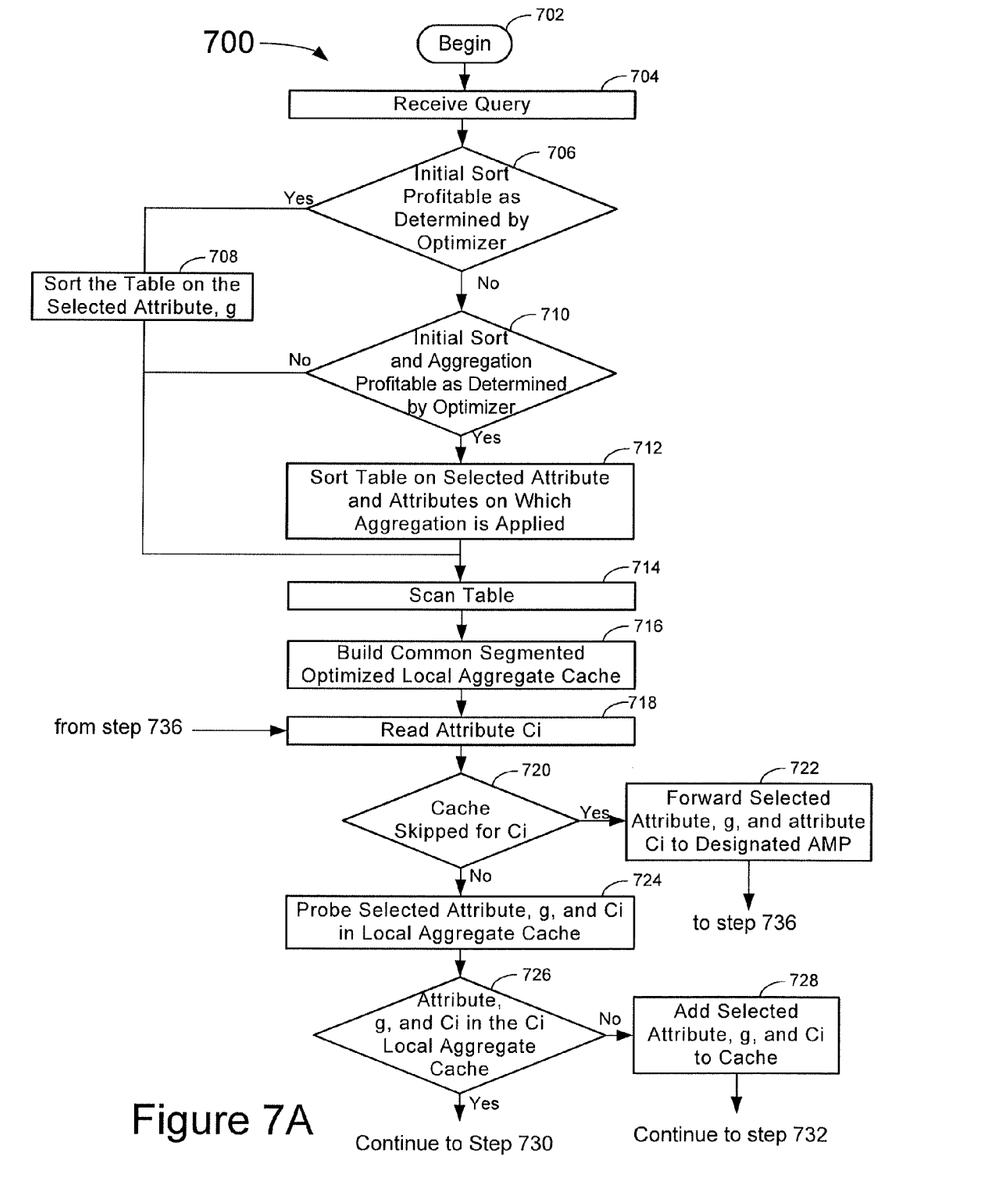
FIGS. 7A-7B show a flowchart that depicts processing of local aggregation routine for each processing module involved in processing of an aggregation query featuring a distinct command implemented in accordance with an embodiment.
Figure 7B:
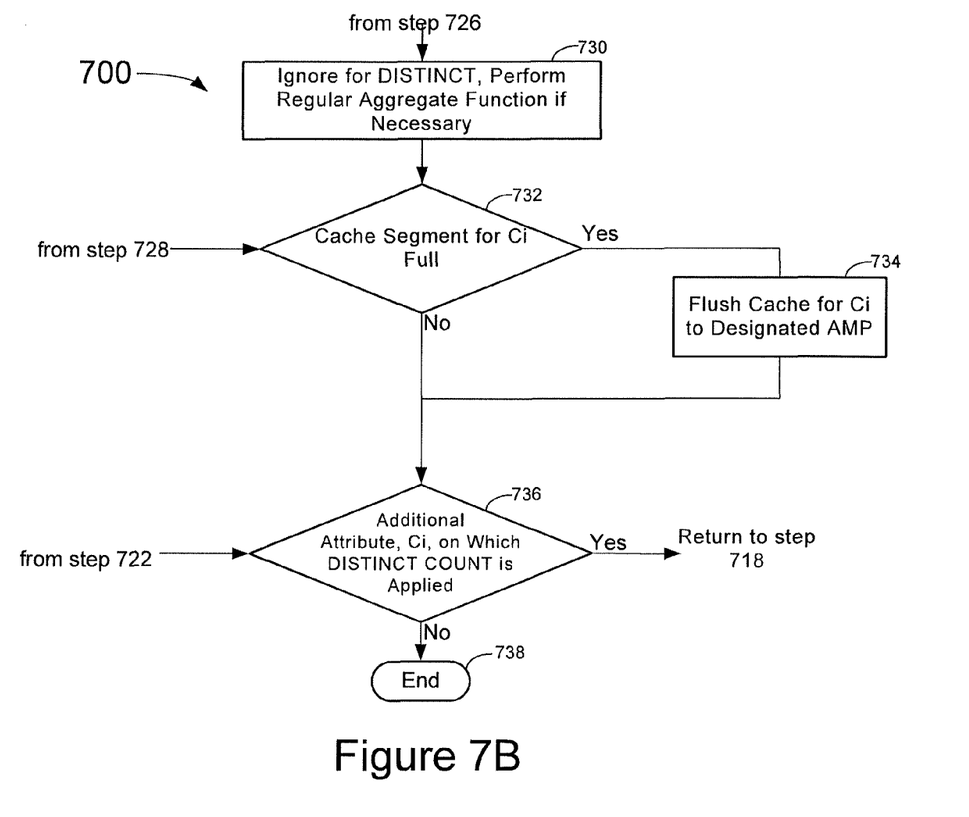

FIGS. 7A-7B show a flowchart 700 that depicts processing of local aggregation routine for each AMP involved in processing of an aggregation query featuring a distinct count command applied to a plurality of table columns implemented in accordance with an embodiment. The processing steps of FIGS. 7A-7B may be implemented as computer-executable instructions tangibly embodied on a computer-readable medium executable by a processing system, such as one or more of the processing nodes $105_1$-$105_Y$ depicted in FIG. 1.

The local aggregation routine is invoked (step 702), and an aggregation query is received (step 704). For illustrative purposes, assume the query includes a DISTINCT COUNT command applied on a plurality of table attributes. The AMP then evaluates whether an initial sort of the table would be profitable, e.g., as determined by the optimizer run by the AMP (step 706). If so, the table is sorted on the selected attribute, g, (step 708), and the aggregation routine then proceeds to scan the table (step 714).

If the initial sort is not determined as profitable by the optimizer at step 706, an evaluation may then be made to determine if an initial sort and aggregation is identified as profitable by the optimizer (step 710). If not, the aggregation routine then proceeds to scan the table according to step 714. If so, the table is sorted on the selected attribute, g, and each of the attributes on which the COUNT DISTINCT aggregation function is applied, duplicates are eliminated, and the sorted results are aggregated (step 712). The aggregation routine then proceeds to scan the table according to step 714.

Figure 5B:
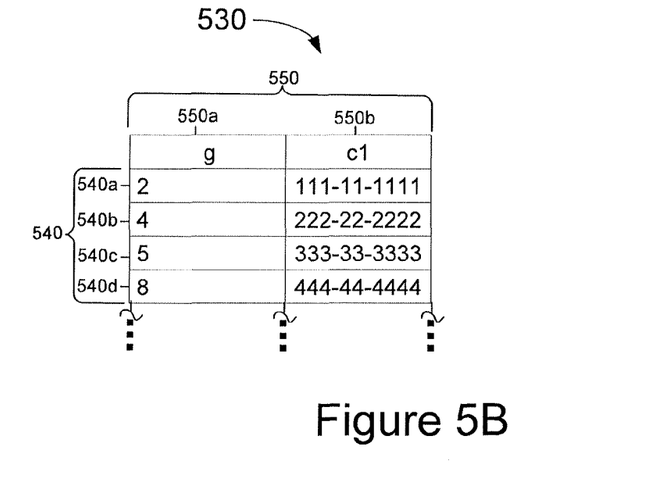
FIG. 5B depicts a segmented local aggregate cache built for a selected attribute and an attribute on which an aggregate function including a DISTINCT COUNT command is applied in accordance with an embodiment.

After the table is scanned according to step 714, a common, segmented optimized local aggregate cache is built (step 716). In the continuing example, a segmented local aggregate cache 530 is built for the selected attribute, g, and the first attribute, c1, on which the COUNT DISTINCT aggregate function is applied as depicted in FIG. 5B. The segmented aggregate cache 530 is populated with rows 540a-540d that include the selected attribute value, g, in field 550a and the attribute, c1, on which the aggregation function is applied as described more fully hereinbelow. In a similar manner, respective local aggregate caches are built for each of the attributes, c2 through cn, on which the DISTINCT COUNT aggregate function is applied. The attribute, Ci, on which the DISTINCT COUNT function is applied is then read from each row of the base table 500 (step 718). An evaluation is then made to determine if the cache was to be skipped for the attribute, Ci, as determined by the optimizer (step 720). If so, the selected attribute, g, and the attribute, Ci, of the rows are then forwarded to a designated AMP (step 722), and the local aggregation routine may then proceed to evaluate whether any additional attributes, Ci, remain to be processed (step 736).

If it is determined at step 720 that cache was not skipped, the aggregation routine may then probe the selected attribute, g, and the attribute, Ci, on which the DISTINCT COUNT command is applied in the segmented, local aggregate cache for each row of the base table 500 to determine if there is a row of the local aggregate cache for the values g and Ci (step 724). An evaluation may then be made to determine if the selected attribute, g, and the attribute, Ci, of the currently evaluated table 500 row are in the local aggregate cache (step 726). If not, the selected attribute, g, and the attribute, Ci, on which the DISTINCT COUNT command is applied are added to the local aggregate cache allocated for the attribute Ci (step 728). The aggregation routine may then proceed to evaluate whether the cache segment for the attribute, Ci, is full (step 732). If the selected attribute, g, and the attribute, Ci, on which the DISTINCT COUNT command is applied are identified as in the local aggregate cache at step 726, the aggregation routine may then ignore the DISTINCT operation, and may perform a regular aggregation, if included, in the query (step 730). For example, in the present example, the SUM operation applied on the attribute x may be performed and stored by the processing node. Thereafter, the local aggregation routine may then evaluate whether the cache segment for the attribute Ci is full (step 732). If so, the cache segment for the attribute, Ci, is then flushed to the AMP for which the attribute, Ci, has been designated (step 734). An evaluation may then be made to determine if an additional attribute, Ci, on which the DISTINCT COUNT command is applied remains for evaluation (step 736). If so, the aggregation routine may then return to step 718 to read the selected attribute, g, and the next attribute, Ci, from the base table. When no additional attribute, Ci, on which the DISTINCT COUNT command is applied remains for evaluation, the local aggregation routine cycle may then end (step 738).

Figure 8A:
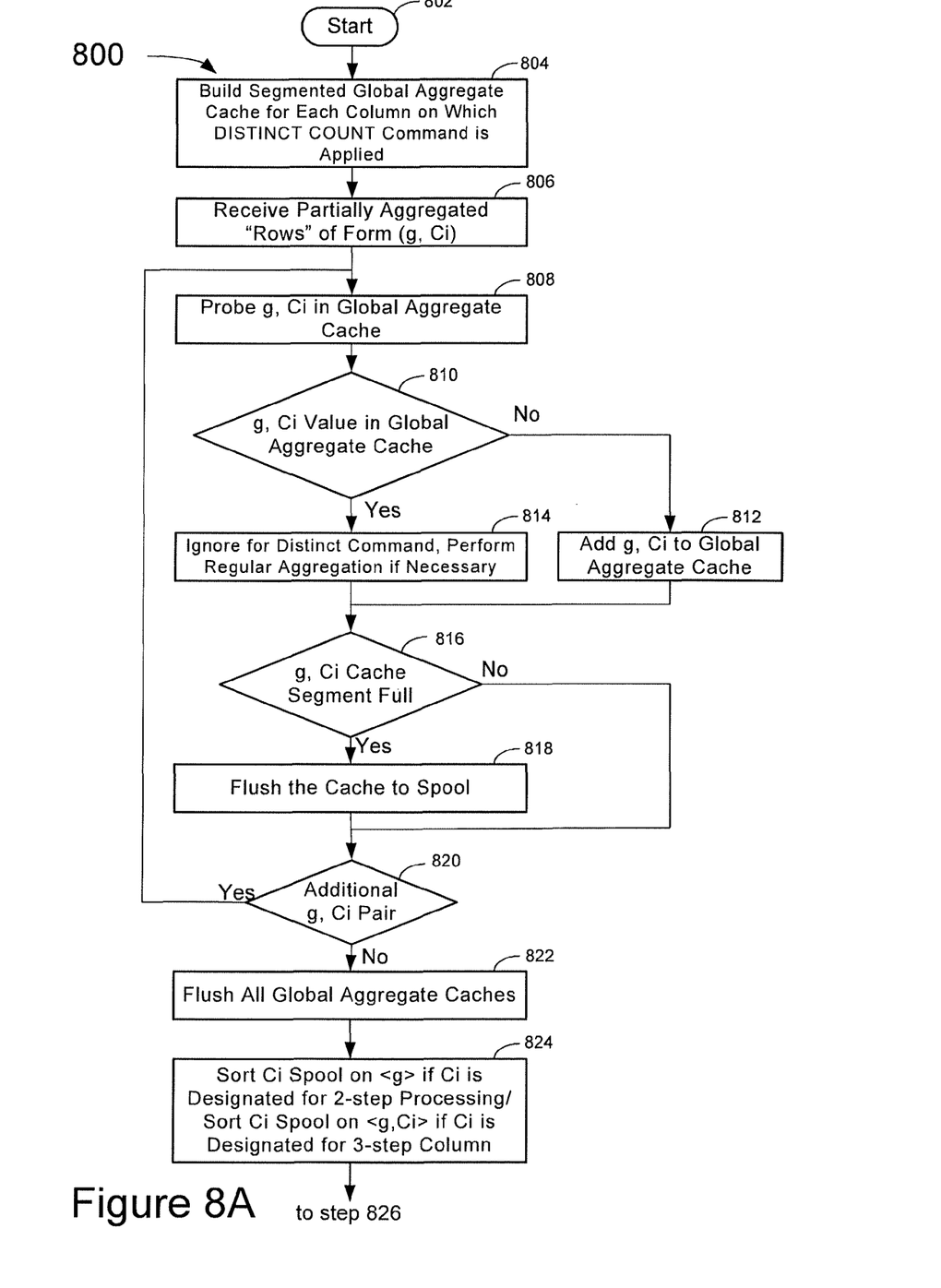
FIGS. 8A-8B show a flowchart that depicts processing of global aggregation routine for each processing module involved in processing of a query featuring a DISTINCT COUNT command in an aggregation query implemented in accordance with an embodiment.
Figure 8B:
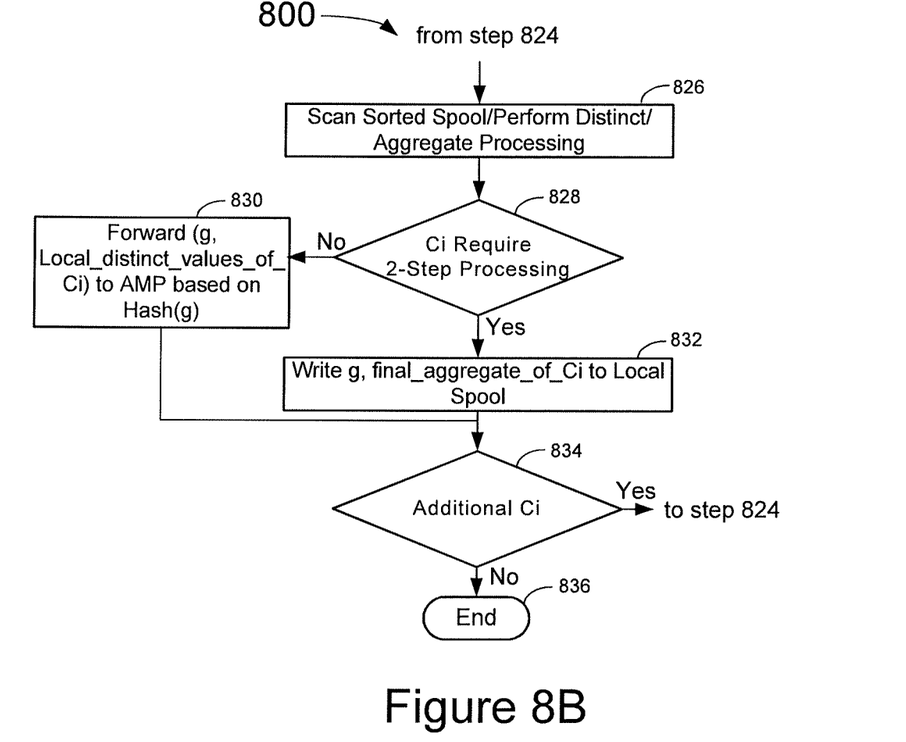

FIGS. 8A-8B show a flowchart 800 that depicts processing of global aggregation routine for each AMP involved in processing of a query featuring a DISTINCT COUNT command applied to a plurality of columns in accordance with an embodiment. The processing steps of FIGS. 8A-8B may be implemented as computer-executable instructions tangibly embodied on a computer-readable medium executable by a processing system, such as one or more of the processing nodes $105_1$-$105_Y$ depicted in FIG. 1.

The global aggregation routine is invoked (step 802), and a segmented global aggregate cache is built for each of the attributes, Ci, on which the DISTINCT COUNT aggregation command is applied (step 804). The segmented global aggregate caches are generated in a similar manner as that described above with regard to the local aggregate cache 530 depicted and described with reference to FIG. 5B. Partially aggregated rows of the form (g, Ci) are received by the AMP from other AMPs involved in processing the query (step 806).

The selected attribute, g, and an attribute, Ci, on which the DISTINCT COUNT command is applied are probed in the global aggregate cache generated for the corresponding attribute Ci (step 808). An evaluation is then made to determine if the selected attribute, g, and the attribute, Ci, on which the DISTINCT COUNT command is applied are located in the global aggregate cache (step 810). If not, the selected attribute, g, and the attribute, Ci, on which the DISTINCT COUNT command is applied are added to the global aggregate cache (step 812), and the global aggregation routine may then evaluate whether the cache segment in which the selected attribute, g, and the attribute, Ci, on which the DISTINCT COUNT command is applied is stored is full (step 816). If, at step 810, it is determined that the selected attribute, g, and the attribute, Ci, on which the DISTINCT COUNT command is applied are included in the global aggregate cache, the DISTINCT command may then be ignored, and a regular aggregation operation may be performed if such an aggregation is included in the query (step 814), e.g., the SUM(x) aggregation in the example query. If, at step 816, it is determined that the global aggregate cache is full, the cache may be flushed to a spool (step 818), and an evaluation is made to determine if there is another selected attribute, g, and attribute, Ci, pair to be evaluated (step 820). If, at step 816, the cache segment allocated for the selected attribute, g, and the attribute, Ci, on which the DISTINCT COUNT command is applied is not full, processing may proceed to determine if there is another selected attribute, g, and attribute, Ci, pair to be evaluated according to step 820. If so, processing then returns to step 808 to probe the next selected attribute, g, and attribute, Ci, pair in the corresponding global aggregate cache allocated for the selected attribute, g, and attribute, Ci. When no additional selected attribute, g, and attribute, Ci, pair remains for evaluation, the routine may then flush all the segmented global aggregate caches to a corresponding spool or other memory allocation (step 822).

Thereafter, the spool(s) for attribute value(s), Ci, on which the DISTINCT COUNT command is applied and that have been designated for 2-step processing are sorted on the selected attribute, g, and the spool(s) for attribute value(s), Ci, on which the DISTINCT COUNT command is applied and that have been designated for 3-step processing are sorted on the selected attribute, g, and the attribute, Ci, (step 824). The designation of each attribute, Ci, on which the DISTINCT COUNT command is applied as 2- or 3-step processing is made according to the routine described hereinabove with reference to FIG. 6. The sorted spools are then scanned, and distinct/aggregate processing is performed thereon (step 826). For each sorted spool, an evaluation may then be made to determine if the attribute, Ci, on which the DISTINCT COUNT command is applied has been designated for 2-step processing (step 828). If not, that is if the attribute, Ci, has been designated for 3-step processing, the selected attribute, g, and the local distinct values of the attribute Ci on which the DISTINCT COUNT command is applied are then forwarded to an AMP based on, for example, a hash value of the selected attribute, g (step 830). Thereafter, an evaluation may be made to determine if there remains another attribute, Ci, spool for processing (step 834). If the evaluation at step 828 indicates the attribute, Ci, has been designated for 2-step processing, the selected attribute, g, and the final aggregate of the attribute, Ci, is written to the AMP's local spool for the attribute, Ci (step 832), and an evaluation may be made to determine if there remains another attribute, Ci, for processing according to step 834. If so, the global aggregation routine returns to step 824 for processing of the next attribute Ci. When no additional attributes, Ci, on which the DISTINCT COUNT aggregation command is applied remain, the global aggregation routine cycle may then end (step 836).

Figure 9A:
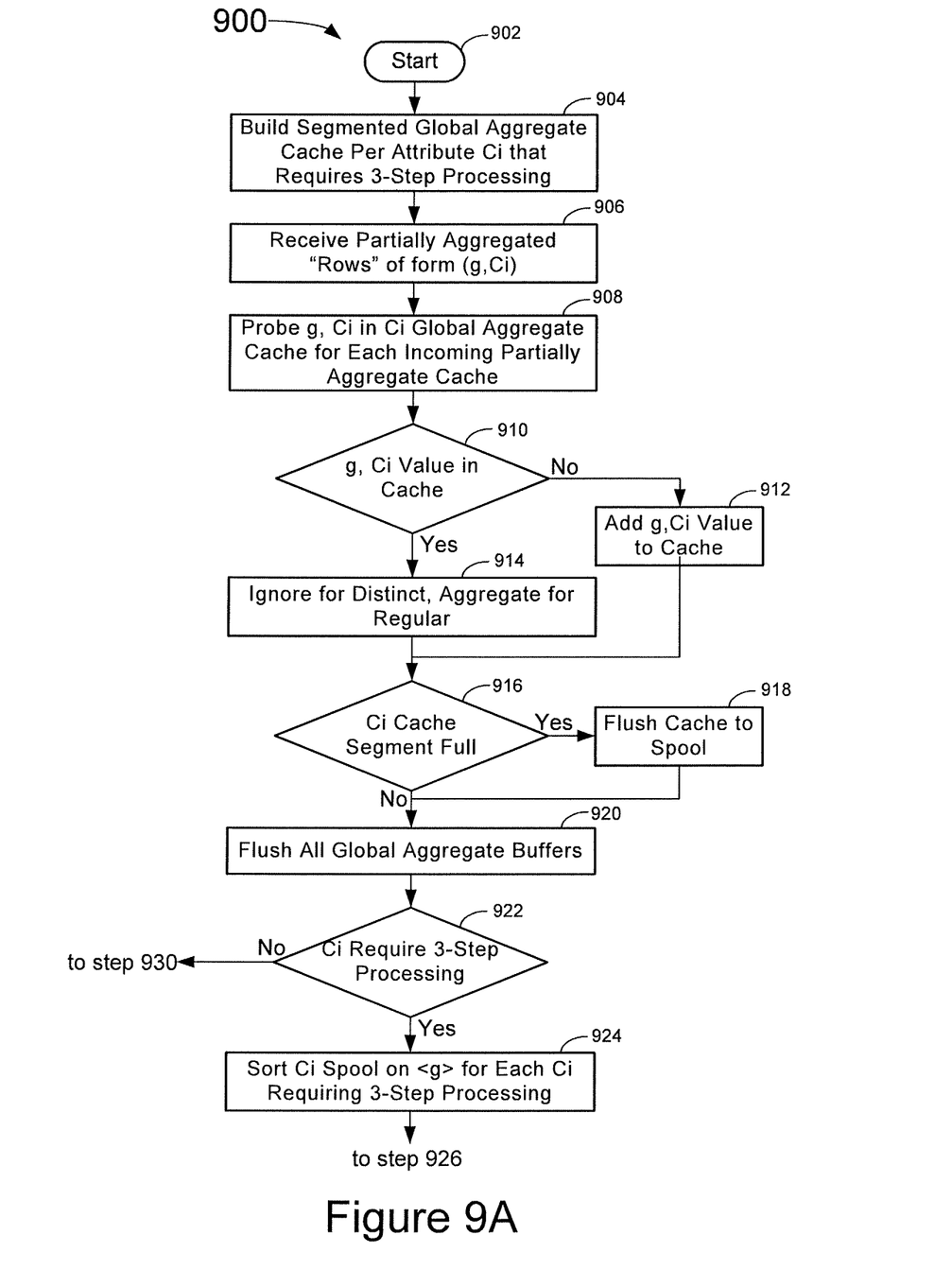
FIGS. 9A-9B show a flowchart that depicts processing of final aggregation routine for each processing module involved in processing of an aggregation query featuring a DISTINCT COUNT command on a plurality of attributes implemented in accordance with an embodiment.
Figure 9B:
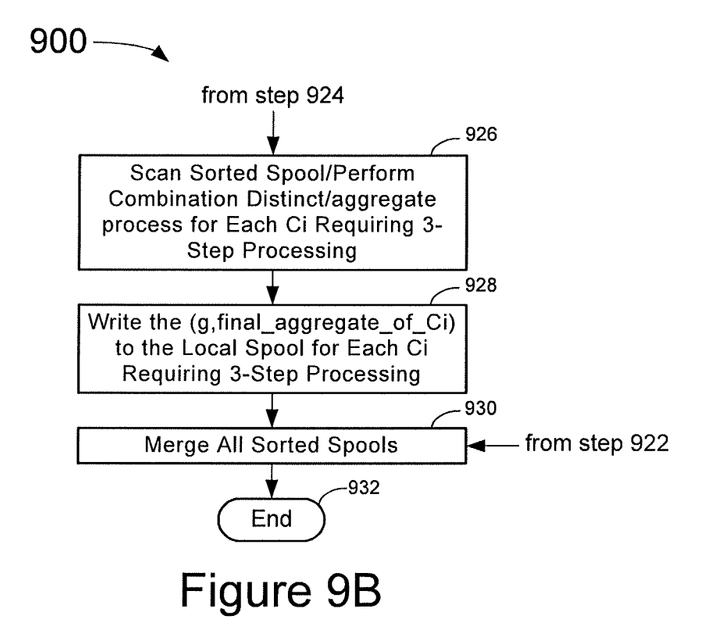

FIGS. 9A-9B show a flowchart 900 that depicts processing of final aggregation routine for each AMP involved in processing of an aggregation query featuring a distinct count command on a plurality of attributes implemented in accordance with an embodiment. The processing steps of FIGS. 9A-9B may be implemented as computer-executable instructions tangibly embodied on a computer-readable medium executable by a processing system, such as one or more of the processing nodes $105_1$-$105_Y$ depicted in FIG. 1.

The final aggregation routine is invoked (step 902), and a segmented global aggregate cache is generated for each attribute, Ci, on which the DISTINCT COUNT command is applied and which requires 3-step processing (step 904). Partially aggregated pairs of the selected attribute, g, and the attribute, Ci, on which the DISTINCT COUNT command is applied are then received (step 906). For each received partially aggregated pairs of the selected attribute, g, and an attribute, Ci, the global aggregate cache allocated for the attribute Ci on which the DISTINCT COUNT command is probed for the corresponding attribute Ci (step 908). An evaluation is then made to determine if the selected attribute, g, and the attribute, Ci, on which the DISTINCT COUNT command is applied are located in the global aggregate cache (step 910). If not, the selected attribute, g, and the attribute, Ci, are added to the global aggregate cache (step 912), and the final aggregation routine may then evaluate whether the cache segment in which the selected attribute, g, and the attribute, Ci, are stored is full (step 916). If, at step 910, it is determined that the selected attribute, g, and the attribute, Ci, on which the DISTINCT COUNT command is applied are included in the global aggregate cache, the DISTINCT command may then be ignored, and a regular aggregation may be performed if such an aggregation is included in the query (step 914), e.g., the SUM(x) aggregation in the example query. If, at step 916, it is determined that the global aggregate cache is full, the cache may be flushed to a spool (step 918), and thereafter all global aggregate buffers may then be flushed (step 920). If the global aggregate cache is evaluated as not full at step 916, the final aggregation routine may then proceed to flush the global aggregate buffers according to step 920.

An evaluation may then be made to determine if a particular attribute, Ci, on which the DISTINCT COUNT command is applied requires 3-step processing (step 922). If not, the final aggregation routine may then proceed to step 930 for merging of all sorted spools. If the particular attribute, Ci, on which the DISTINCT COUNT command is applied requires 3-step processing, the spool for the particular attribute, Ci, may then be sorted on the selected attribute, g, (step 924). The sorted spool for the attribute, Ci, may then be scanned, and DISTINCT processing is performed on the sorted spool along with regular aggregate processing, if necessary (step 926). The final aggregation for the attribute Ci and the selected attribute, g, is then written to the local spool allocated for the attribute Ci (step 928). A final result is then generated by merging all sorted spools (step 930). The final aggregation routine cycle may then end (step 932).

The flowcharts of FIGS. 6A-9B depict process serialization to facilitate an understanding of disclosed embodiments and are not necessarily indicative of the serialization of the operations being performed. In various embodiments, the processing steps described in FIGS. 6A-9B may be performed in varying order, and one or more depicted steps may be performed in parallel with other steps. Additionally, execution of some processing steps of FIGS. 6A-9B may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method for counting a number of distinct values in multiple columns of a database table, the method comprising the steps of: associating a portion of the database table with each one of a plurality of processing modules;

at each one of the plurality of processing modules, performing a local aggregation function to count occurrences of distinct values in each one of the multiple columns of the associated portion of the database table;

creating a local aggregation cache corresponding to each one of the columns of the database table; and saving the count of occurrences of the distinct values in each one of the columns to the corresponding local aggregation cache;

creating a plurality of global aggregation caches, wherein each global aggregation cache corresponds to one of the columns of the database table; and assigning one of the multiple columns to a corresponding one of the plurality of processing modules; and at each of the plurality of processing modules:

receiving the count of occurrences from the local aggregation cache corresponding to the assigned one of the multiple columns of the database table; and merging the count of occurrences for each one of the assigned columns from the local aggregation caches into the corresponding global aggregation cache; and determining the total count of the number of occurrences of the distinct values in the multiple columns of the database table based on the global aggregation caches.

2. The method of claim 1, further comprising:

determining a number of distinct values of a reference column of the database table different from the plurality of multiple columns;

for each distinct value in the reference column, determining, for each of the multiple columns, a respective number of expected rows that share a row with the respective distinct value of the reference column;

for each respective number of expected rows, determining a respective data skew value indicative of uniformity of the respective number of expected rows relative to other respective numbers of expected rows;

for each multiple column, comparing each of the number of distinct values of the reference column, the respective number of expected rows, and the respective data skew value to a respective predetermined threshold; and for each multiple column, determining to use a second global aggregation cache to determine the total count of the number of occurrences of the distinct value in the multiple columns of the database table in response to at least one of the number of distinct values of the reference column, the respective number of expected rows, and the respective data skew value being greater than the respective predetermined threshold.

3. The method of claim 1, wherein determining the total count of the number of occurrences of the distinct value in the multiple columns of the database table based on the global aggregation caches comprises merging the count values for each one of the columns from the global aggregation caches to provide a total count of the number of occurrences of the distinct value in said multiple columns of said database table.

4. The method of claim 1, further comprising:

selecting a reference column from the database table different from the multiple columns; and determining each distinct value in the reference column, wherein creating the local aggregation cache comprises creating a local aggregation cache corresponding to both each one of the multiple columns of the database table and each one of the distinct values in the reference column.

5. The method of claim 1, further comprising:

selecting a reference column from the database table different from the multiple columns; and determining each distinct value in the reference column, wherein creating the plurality global aggregation caches comprises creating a plurality global aggregation a caches, wherein each global aggregation cache corresponds to both a respective one of the multiple columns of the database table and a respective one of the distinct values in the reference column.

6. The method of claim 1 further comprising:

determining presence of at least one predetermined condition associated with initially sorting the database table; and initially sorting the database table in response to presence of the predetermined condition.

7. A database system comprising:

a storage device configured to store a database table having multiple columns;

a plurality of processors in communication with the storage device, wherein, each of the plurality of processors is associated with a portion of the database, wherein, each of the plurality of processors is configured to perform a local aggregation function to count occurrences of distinct values in each one of the multiple columns included in the associated portion of the database, wherein, each of the plurality of processors is further configured to create a local aggregation cache corresponding to each one of the multiple columns included in the associated portion of the database, wherein, each of the plurality of processors is further configured to save the count of occurrences for each multiple column in the corresponding local aggregation cache, wherein, each of the plurality of processors is further configured to create a plurality of global aggregation caches, wherein each global aggregation cache corresponds to a respective one of the multiple columns, wherein, each of the plurality of processors is further configured to receive the count of occurrences from the local aggregation caches associated with a corresponding global aggregation cache, wherein, each of the plurality of processors is further configured to merge the count of occurrences from the received local aggregation caches into the corresponding global aggregation cache, and wherein, at least a portion of the plurality the processors is configured to determine a total count of the number of occurrences of the distinct values in the multiple columns of the database table based on the plurality of global aggregation caches.

8. The database system of claim 7, wherein at least one of the plurality of processors is configured to:

determine a number of distinct values of a reference column of the database table different from the plurality of multiple columns;

for each distinct value in the reference column, determine, for each of the multiple columns, a respective number of expected rows that share a row with the respective distinct value of the reference column; and for each respective number of expected rows, determine a respective data skew value indicative of uniformity of the respective number of expected rows relative to other respective numbers of expected rows;

for each multiple column, compare each of the number of distinct values of the reference column, the respective number of expected rows, and the respective data skew value to a respective predetermined threshold;

for each multiple column, determine to use a second global aggregation cache to determine the total count of the number of occurrences of the distinct value in the multiple columns of the database table in response to at least one of the number of distinct values of the reference column, the respective number of expected rows, and the respective data skew value being greater than the respective predetermined threshold.

9. The database system of claim 7, wherein each of the plurality of processors is configured to merge the count values for each one of the columns from the corresponding global aggregation caches to provide a total count of the number of occurrences of the distinct value in said multiple columns of said database table.

10. The database system of claim 7, wherein the database table includes a reference column different from the multiple columns, and wherein each of the plurality of processors is further configured to create a local aggregation cache corresponding to both a respective one of the multiple columns of the database table and a respective distinct value in the reference column.

11. The database system of claim 7, wherein the database table includes a reference column different from the multiple columns, and wherein each of the plurality of processors is further configured to create a plurality global aggregation caches, wherein each aggregation cache corresponds to both a respective one of the multiple columns of the database table and a respective one of a distinct value in the reference column.

12. A non-transitory computer-readable medium encoded with a plurality of instructions executable by a processor, the computer-readable medium comprising:
    instructions to associate a portion of a database table having multiple columns with each of a plurality of processing modules;
    instructions to perform a local aggregation function at each of the plurality of processing modules to count occurrences of distinct values in each column of the associated portion of the database table;
    instructions to create a local aggregation cache corresponding to a respective one of the multiple columns of the database table;
    instructions to save the count of occurrences of distinct values in each of the multiple columns to the corresponding local aggregation cache;
    instructions to create a plurality of global aggregation caches, wherein each global aggregation cache corresponds to one of the multiple columns;
    instructions to assign one of the multiple columns to a corresponding one of the plurality of processing modules;
    instruction to receive, at each of the plurality of processing modules, the count of occurrences from the local aggregation cache corresponding to the assigned one of the multiple columns;
    instruction to merge, at each of the plurality of processing modules, the count of occurrences for each one of the assigned multiple columns from the local aggregation caches into the corresponding global aggregation cache; and
    instructions to determine the total count of the number of occurrences of the distinct values in the multiple columns of the database table based on the global aggregation caches.

13. The non-transitory computer-readable medium of claim 12, further comprising:
    instructions to determine a number of distinct values of a reference column of the database table different from the plurality of multiple columns;
    for each distinct value in the reference column, instructions to determine, for each of the multiple columns, a respective number of expected rows that share a row with the respective distinct value of the reference column;
    for each respective number of expected rows, instructions to determine a respective data skew value indicative of uniformity of the respective number of expected rows relative to other respective numbers of expected rows;
    for each multiple column, instructions to compare each of the number of distinct values of the reference column, the respective number of expected rows, and the respective data skew value to a respective predetermined threshold; and
    for each multiple column, instructions to determine to use a second global aggregation cache to determine the total count of the number of occurrences of the distinct value in the multiple columns of the database table in response to at least one of the number of distinct values of the reference column, the respective number of expected rows, and the respective data skew value being greater than the respective predetermined threshold.

14. The non-transitory computer-readable medium of claim 12, wherein the instructions to determine the total count of the number of occurrences of the distinct value in the multiple columns of the database table based on the global aggregation caches comprises instructions to merge the count values for each one of the columns from the global aggregation caches to provide a total count of the number of occurrences of the distinct value in said multiple columns of said database table.

15. The non-transitory computer-readable medium of claim 12, further comprising:
    instructions to selecting a reference column from the database table different from the multiple columns; and
    instructions to determine each distinct value in the reference column, wherein the instructions to create the local aggregation cache comprises instructions to create a local aggregation cache corresponding to both each one of the multiple columns of the database table and one of the distinct values in the reference column.

16. The non-transitory computer-readable medium of claim 12, further comprising:
    instructions to select a reference column from the database table different from the multiple columns; and
    instructions to determine each distinct value in the reference column, wherein the instructions to create a plurality global aggregation caches comprise instructions to create a plurality global aggregation a caches, wherein each global aggregation cache corresponds to both a respective one of the multiple columns of the database table and a respective one of the distinct values in the reference column.

17. The non-transitory computer-readable medium of claim 12 further comprising:
    instructions to determine presence of a predetermined condition associated with an initial sort of the database table; and
    instructions to initially sort the database table in response to presence of the predetermined condition.

* * * * *